United States Patent Office 3,216,852
Patented Nov. 9, 1965

3,216,852
SYNTHETIC FIBER COATED WITH WATER-SOLUBLE POLYHYDROXYALKYL ACRYLATES
Albert I. Goldberg, Berkeley Heights, N.J., assignor to National Starch and Chemical Corporation, New York, N.Y., a corporation of Delaware
No Drawing. Filed July 18, 1960, Ser. No. 43,319
3 Claims. (Cl. 117—138.8)

This invention relates to water-soluble homo- and copolymers of polyhydroxyalkyl acrylates and their use in treating synthetic fibers.

While the invention will be described and exemplified in terms of the use of the above mentioned polymers in their use as a warp sizing agent for synthetic fibers, it is to be understood that the polymers of this invention may likewise be used in other synthetic fiber coting and impregnating operations.

In the weaving art it is customary to size the warp fibers prior to the weaving process in order to impart greater cohesiveness, compactness, smoothness and improved resistance to abrasion. In the past, polymeric sizing agents for synthetic fibers, such as nylon, acetate, polyester and polyacrylonitrile have been used. They have met with limited success particularly because any given sizing agent was usually suitable only for a particular synthetic fiber and did not possess properties that would allow its use on a substantial number or all of the most common synthetic fibers. Additionally, a satisfactory sizing agent has not been found for the newer polyolefin fibers, such as polyethylene and polypropylene.

I have now discovered a novel sizing material which is unique in its ability to satisfactorily warp size all commonly known types of synthetic fibers including the polyolefins. Moreover, the warp size of my invention has been found to provide sized yarns which display a coherence and resistance to abrasion which is at least equivalent and in many cases superior to the results obtained when sizing these yarns with the materials of the prior art.

Generally stated, the novel compositions of this invention, useful as warp sizing agents, comprises aqueous solutions of polyhydroxyethyl acrylate, as well as copolymers of hydroxyethyl acrylate and a vinyl type monomer. Illustrative of the vinyl type monomers that may be copolymerized with the hydroxyethyl acrylate are vinyl acetate, methyl acrylate, ethyl methacrylate, acrylonitrile, styrene and the like.

When the polymeric materials of this invention are used as warp size agents, it is desirable that, in the case where the polymer is a copolymer of hydroxyethyl acrylate and a vinyl monomer that the vinyl monomer not be present in a quantity greater than 25% by weight of the copolymer. In concentrations greater than 25%, the copolymers are water insoluble. A further requisite of the polymers useful as warp size agents is that their molecular weight, as expressed in terms of their intrinsic viscosity, be within the range of 0.5 to 5.0.

Polyhydroxyethyl acrylate is obtained by the polymerization of monomeric hydroxyethyl acrylate. A method of preparing the monomer is described in copending application, now abandoned, Serial No. 843,644, filed October 1, 1959, assigned to the assignees of the present invention.

Since the polymers of this invention are water-soluble, and moreover, when employed as warp sizing agents, are to be used in an aqueous medium, it is convenient to conduct the polymerization by aqueous solution techniques.

As an alternative to polymerization in an aqueous medium, the polymerization may be conducted in an organic solvent (such as methanol), which is completely miscible with water in all proportions and which will also act as a solvent for the resulting polymer. The organic solution of the polymer may then be dispersed in an aqueous medium prior to its use.

As stated above, in their use as warp sizing agents the polymers of this invention should have a molecular weight, as expressed in terms of intrinsic viscosity, in the range of 0.5 to 5.0. Polymers having an intrinsic viscosity above 5.0 are found to be exceedingly viscous and thus require extensive dilution. This results in excessive absorption of water by the yarn during the sizing operation thereby necessitating an extended drying period and presenting other operational disadvantages. On the other hand, polymers having an intrinsic viscosity below 0.5 have been found to be unsatisfactory. Yarns treated with sizing agents having an intrinsic viscosity below 0.5 have low cohesion and poor abrasion resistance. The formula for determining the intrinsic viscosity can be found at page 248 in Principles of High-Polymer Theory and Practice, by Schmidt and Marlies, 1948.

There are a number of techniques for preparing watersoluble homo- and copolymers of hydroxyacrylate whose intrinsic viscosity come within the above noted limits. Broadly stated, these techniques involve the use of chain transfer agents, the control of the reaction temperature, or the slow dadition of monomer during the course of polymerization.

The polymerization of homo- or copolymers of hydroxyethyl acrylate by means of aqueous solution techniques involves the addition of monomer to water in the presence of from about 0.1 to 2.0%, as based on the weight of monomer, of a water-soluble free-radical initiator. Suitable initiators include the inorganic persulfate salts such as ammonium or potassium persulfate and peroxides such as hydrogen peroxide. The polymerization may be conducted under reflux at 100° C. although temperatures of 50° C. or lower are satisfactory. Agitation is applied throughout the course of the reaction which is usually complete in approximately 1 to 4 hours.

As for the polymerization of hydroxyethyl acrylate or its copolymers by means of organic solvent techniques, the methods employed are comparable to those described here for their aqueous solution polymerization with the exception, of course, that in place of water a proper solvent medium is used and, in addition, the free-radical initiator which is utilized should be soluble in the solvent such, for example, as one of the organic peroxides or aliphatic azobisnitrile compounds.

The following examples (I–VIII) illustrate the preparation of the novel water-soluble polymers of this invention. In these examples all parts are by weight unless otherwise noted.

EXAMPLE I

This example illustrates the preparation of water-soluble polyhydroxyethyl acrylate by means of an aqueous solution polymerization technique, utilizing a slow addition of monomer in order to produce a polymer having the desired molecular weight.

Into a reaction vessel equipped with mechanical stirrer, thermometer, reflux condenser and addition funnel, there were introduced 400 parts of water and 0.25 part of ammonium persulfate. The latter was dissolved with stirring and the solution was heated to 80° C. on a water bath. With agitation, 100 parts of hydroxyethyl acrylate monomer were then uniformly added over a two hour period. The solution became increasingly more viscous and was then heated for an additional thirty minutes whereupon the conversion was found to be essentially complete. The resulting aqueous solution polymer had a resin solids content of 20% by weight, and its intrinsic viscosity, as determined in methanol at 30° C., was 0.7.

EXAMPLE II

This example illustrates the preparation of polyhydroxyethyl acrylate by means of an aqueous solution polymerization technique utilizing a chain transfer agent in order to produce a polymer having the desired molecular weight.

Into a reaction vessel equipped with mechanical stirrer, thermometer and reflux condenser were introduced 400 parts of water and 100 parts of hydroxyethyl acrylate monomer, 0.1 part of ammonium persulfate, and 0.6 part of mercaptoethanol, as a chain transfer agent. The resulting solution was then heated, on a water bath, to 70° C. and held at this temperature for two hours. The aqueous solution copolymer prepared in this manner had a resin solids content of 19.0%, by weight, and an intrinsic viscosity, as determined in methanol at 30° C., of 2.2.

EXAMPLE III

This example illustrates the preparation of a hydroxyethyl acrylate:methyl acrylate copolymer by means of an aqueous solution polymerization technique.

In preparing this copolymer, the process described in Example II was repeated except that 5 parts of methyl acrylate and 95 parts of hydroxyethyl acrylate were used to form the copolymer. The resulting hydroxyethyl acrylate:methyl acrylate (95:5) aqueous solution copolymer had a resin solids content of 19.3%, by weight, and an intrinsic viscosity as determined in methanol at 30° C., of 2.4.

EXAMPLE IV

This example illustrates the preparation of a hydroxyacrylate:vinyl acetate copolymer by means of an aqueous polymerization technique.

In preparing this copolymer, the process described in Example I was repeated except that 15 parts of vinyl acetate and 85 parts of hydroxyethyl acrylate monomer were mixed and uniformly added over a two hour period with the temperature being maintained at 75° C. The resulting aqeuous hydroxyethyl acrylate:vinyl acetate (85:15) solution copolymer had a resin solids content of 19.0% and its intrinsic viscosity, as determined in methanol at 30° C., was 0.5.

EXAMPLE V

This example illustrates the preparation of polyhydroxyethyl acrylate in an organic solvent.

Into a reaction vessel equipped with a mechanical stirrer, thermometer, and reflux condenser, there were introduced 350 parts of methanol and 0.45 part of benzoyl peroxide. The latter was dispersed with stirring and the solution was heated to reflux at 56° C. At reflux, 150 parts of hydroxyethyl acrylate monomer were introduced uniformly over a two hour period. The mixture was held at reflux for one hour at which time the solution was quite viscous and the polymerization was substantially complete. The solids content of the resulting polymer was determined and found to be 28.8% while its intrinsic viscosity, as determined in methanol at 30° C., was 0.9.

EXAMPLE VI

This example illustrates the preparation of a hydroxyethyl acrylate:vinyl acetate copolymer by means of an organic solvent polymerization technique.

In preparing this copolymer, the procedure described in Example V was followed except that 37.5 parts of the hydroxyethyl acrylate were replaced with an equal amount of vinyl acetate. The resulting hydroxyethyl acrylate: vinyl acetate (75:25) alcoholic solution copolymer was found to have a solids content of 28.2% and its intrinsic viscosity, as determined in methanol at 30° C., was 0.64.

EXAMPLE VII

This example illustrates the preparation of polyhydroxyethyl acrylate by means of an aqueous solution polymerization technique.

In preparing this polymer the procedure described in Example I was followed except that the temperature was held at 70° C. The resulting aqueous solution of polyhydroxyethyl acrylate had a resin solids content of 20%, by weight, and its intrinsic viscosity, as determined in methanol at 30° C., was 2.6.

EXAMPLE VIII

This example illustrates the preparation of polyhydroxyethyl acrylate by means of an aqueous solution polymerization technique.

In preparing this polymer the procedure described in Example I was followed except that only 70 parts of hydroxyethyl acrylate were slow added at 60° C. The resulting aqueous solution of polyhydroxyethyl acrylate had a resin solids content of 14.5%, by weight, and its intrinsic viscosity, as determined in methanol at 30° C., was 5.0.

Generally stated, warp sizing or slashing, as it is often referred to, of textile yarns comprises impregnating the yarns with a sizing solution or dispersion. Excess sizing is removed by passing the wet impregnated yarn through a set of squeeze rolls followed by a drying step.

There are several methods for carrying out the warp sizing all of which are well known in the art.

I have found that the polymers of this invention can be most effectively used as warp sizing agents when applied to the fiber in an aqueous solution. Suitable concentrations of the polymer in the aqueous solution range from 2 to 8% and preferably from 4 to 6%, by weight, of resin solids. To achieve the desired concentration may require the dilution of the initial aqueous polymer solutions, since, as prepared, the polymer concentration is generally from 15 to 35%, by weight, of resin solids. When using polymers prepared by means of water-soluble organic solvent polymerization techniques, it is necessary to dilute the resulting solutions with the appropriate amount of water.

Warp size softeners such as various oleaginous materials which aid in the lubrication of sized yarn may also, when desired, be added to the sizing formulation. With respect to these softeners it should be noted that they often tend to decrease the film strength of the sizing material and thus it is desirable to reduce to a minimum the amount of softener used. I have found that using warp size softeners in an amount equivalent to about 2%, by weight, of the resin gives a satisfactory result.

Continuous filament yarns of polyethylene, polypropylene, nylon, polyester and acetate fibers were sized by passing the yarns through a sizing bath, then through a set of squeeze rolls to remove the surface size and then air dried. Sizing solutions were prepared from the homo- and copolymers described in Examples I–IV and VII. For comparative data, the yarns sized with the compositions of this invention were prepared with yarns sized with standard sizing formulations presently used, namely: (a) an aqueous solution containing essentially 25%, by weight, of polyacrylic acid, this composition being a material which is presently employed as a sizing agent for nylon yarns; (b) an aqueous dispersion containing 25%, by weight, of an acrylic acid terpolymer, this composition being a material which is presently employed as a sizing agent for polyester yarns; and (c) a solid water-soluble maleic acid-styrene copolymer, this composition being a material which is presently employed as a sizing agent for acetate yarns. Each of these controls, as well as the polymers of my invention, were prepared for use in the form of aqueous solutions having a resin solids content of 5%, by weight. Since polyethylene and polypropylene yarns have only recently been made available for commercial textile applications, a standard sizing agent has not been established for these materials. Thus, comparative data was not obtainable.

After the sizing operation had been completed, the sized yarns were conditioned for 24 hours at a temperature of 72° F. and a relative humidity of 50%. In testing the cohesive strength of these yarns, a Duplan Cohesion Tester, as sold by Geier and Bluhm, Inc., of Troy, New York, was utilized. This device consists of a mechanically propelled friction plate which moves back and forth over the sample of sized yarn while the latter is tightly laced between a series of porcelain hooks. Upon noticing a partial separation or fraying of the yarn into its component multifilaments, note is made of the number of cycles which have elapsed. The separation of the yarn, in this manner, indicates that the protective action of the size has been lost. Thus, the number of cycles which each sample withstands is a direct indication of the sizing efficiency of the particular warp sizing agent. Table I presents the results of these cohesion strength tests.

Table I

| Sizing agent | Total number of cycles | | | | |
|---|---|---|---|---|---|
| | Polyethylene | Polypropylene | Nylon | Polyester | Acetate |
| Polymer of EX. I | 13 | 19 | 14 | 21 | 13 |
| Polymer of EX. II | 65 | 29 | 15 | 15 | 10 |
| Polymer of EX. III | 48 | 70 | 10 | 35 | 11 |
| Polymer of EX. IV | 18 | 22 | 10 | 14 | 10 |
| Polymer of EX. VII | 14 | 14 | 18 | 17 | 20 |
| Polyacrylic acid* | | | 10 | | |
| Acrylic terpolymer* | | | | 14 | |
| Maleic acid-styrene copolymer* | | | | | 10 |

*Control.

The above data clearly demonstrates that compositions of this invention may be successfully employed as warp sizing agents for a wide variety of synthetic yarns each of which ordinarily requires a different sizing material.

Set forth below in Table II is cohesion strength data obtained from synthetic yarns which have been sized with the hydroxyethyl acrylate homo- and copolymers prepared by the organic solvent polymerization techniques described in Examples V and VI.

The synthetic yarns were sized according to the earlier described procedure. The sizing solutions were formulated by diluting each of the initial polymer solutions with methyl alcohol to a resin solids content of 20%, by weight. They were then further diluted to a solids content of 5%, by weight, by being poured into water with agitation.

Table II

| Sizing agent | Total number of cycles | | | | |
|---|---|---|---|---|---|
| | Polyethylene | Polypropylene | Nylon | Polyester | Acetate |
| Polymer of EX. V | 15 | 10 | 50 | 26 | 40 |
| Copolymer of EX. VI | 16 | 14 | 12 | 14 | 12 |

I have indicated that for polymers of this invention to be used as warp sizing agents that the intrinsic viscosity of same be between 0.5 and 5.0, as measured by the aforedescribed procedure. In the case of polymers having an intrinsic viscosity greater than 5.0, it was found that there was excessive pickup of the polymer solution by the yarns and that the high viscosity made it difficult to use conventional warp sizing equipment. For example, polymer solutions having an intrinsic viscosity greater than 5.0 have poor flow properties and tend to build up at the nip or squeeze rolls. Further, they tend to stick to the drying apparatus where excessive build up takes place. Moreover, they display a tendency to coat the yarns nonuniformly with the result of a taping or sticking together of narrow ribbons of the yarn. This phenomenon results in a non-uniform yarn distribution.

I claim:

1. A warp sized synthetic fiber comprising a synthetic fiber coated with a water-soluble polymer selected from the groups consisting of water-soluble polyhydroxyethyl acrylate and water-soluble copolymers of hydroxyethyl acrylate and a polymerizable vinyl monomer containing a $CH_2$=C< group, said vinyl monomer being present in an amount up to 25 percent by weight of the copolymer.

2. The product of claim 1 wherein said vinyl monomer is methyl acrylate.

3. The product of claim 1 wherein said vinyl monomer is vinyl acetate.

References Cited by the Examiner

UNITED STATES PATENTS

| | | | |
|---|---|---|---|
| 2,129,722 | 9/38 | Woodhouse | 260—89.5 |
| 2,636,015 | 4/53 | Schmutzler | 260—33.4 |
| 2,681,897 | 6/54 | Frazier et al. | 260—78.4 |
| 2,727,835 | 12/55 | Barrett | 117—139.5 XR |
| 2,819,237 | 1/58 | Daniel | 260—29.6 |
| 2,819,296 | 1/58 | Carnes et al. | 260—486 |
| 2,841,567 | 7/58 | Blanton et al. | 117—139.5 XR |
| 2,923,653 | 2/60 | Matlin et al. | 260—29.6 |
| 2,946,705 | 7/60 | Olsen | 117—139.5 |

WILLIAM D. MARTIN, *Primary Examiner.*

DANIEL J. ARNOLD, LEON J. BERCOVITZ,
*Examiners.*